Feb. 26, 1929.
E. J. KILEY
1,703,674
VALVE
Filed April 25, 1927
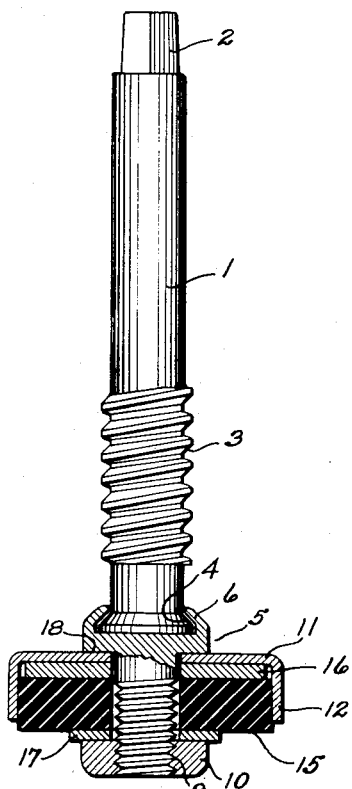
FIG. 1.
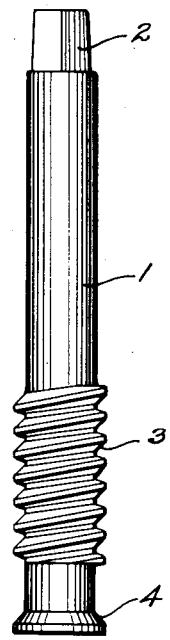
FIG. 2.
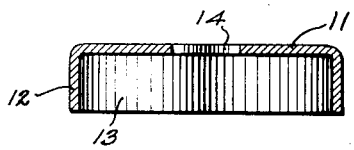
FIG. 3.    FIG. 4.    FIG. 5.
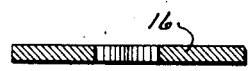
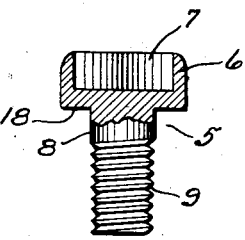
FIG. 6.    FIG. 7.    FIG. 8.
Witness:
H. J. Stromberger
Inventor
EDWARD J. KILEY
By
Attorney Patented Feb. 26, 1929.

1,703,674

UNITED STATES PATENT OFFICE.

EDWARD J. KILEY, OF MANSFIELD, OHIO, ASSIGNOR TO THE OHIO BRASS COMPANY, OF MANSFIELD, OHIO, A CORPORATION OF NEW JERSEY.

VALVE.

Application filed April 25, 1927. Serial No. 186,265.

My invention relates to valves and particularly to the disc holder and stem in connection with valves.

The object of my invention is to provide a simple, efficient and economical disc holder and stem, and my invention resides in the new and novel construction, combination and relation of the various parts hereinafter fully described and disclosed in the accompanying drawing.

In the drawing:

Fig. 1 is an assembled view of my invention in partial longitudinal section.

Fig. 2 is a side view of the stem portion.

Fig. 3 is the disc holder.

Fig. 4 is a compression washer.

Fig. 5 is a swivel connecting member for holding the various parts together and in swiveled relation to the stem.

Fig. 6 is a composition disc.

Fig. 7 is a simple washer.

Fig. 8 is a nut cooperating with Fig. 5 for holding the parts together.

In the preferred embodiment of my invention I employ a stem 1, of the usual construction, provided at the upper end with a plurality of sides 2 upon which is mounted the usual hand wheel or other handle. Upon the stem is formed a thread 3, which cooperates with a thread on the body to move the valve stem longitudinally of the body when rotated, and at the lower end of the stem is an enlarged head or flange 4 and to which is secured in swiveled relation thereto the connecting member shown in Fig. 5.

The connecting member 5 shown in Fig. 5 has at one end a cup-shaped construction having the upstanding rim 6 and forming the recess 7. The stem 8 is provided with the threads 9 to engage with threads on the nut 10. The member 5 is preferably made or rolled or drawn brass rod, as this material is well adapted to be used in automatic screw machines, and, therefore, the piece can be turned out at a very rapid rate and small cost and absolutely uniform. The upstanding rim or flange 6 is adapted to be crimped, rolled or turned inwardly so as to cooperate with the flange 4 on the stem 1 to hold the two parts together in swiveled relation, as shown in Fig. 1.

The stem 1 can be formed of a casting, but it is also of such a construction that it is very easy to form the same of a rolled or drawn brass rod by means of an automatic screw machine, which, as before stated, lends to accuracy and low cost of production.

The disc holder 11 I prefer to form of very light sheet brass by the usual well known stamping and forming methods, and comprises the flange 12, the recess 13 and the orifice 14 through which passes the stem 8. The member 11 I prefer to make of a thin material as this lends to cheapness and ease of construction and less wear and tear on the equipment than is the case with heavy metal, and I prefer to form this of sheet metal rather than from a casting, because it is possible to produce a uniform article at a very much less cost. It will be recognized by those versed in the art and from an inspection of Fig. 1 that the valve is closed when downward pressure is brought upon the member 11 by the member 5, and that this pressure is concentrated near the center of the member 11, while the upward pressure of the valve seat against the lower face of the composition disc 15 will be adjacent the outer rim of the disc 15, therefore, there will be a strong tendency for the disc 15 to crack or, under some conditions, bend out of shape. This is not desirable, therefore, interposed between the composition disc 15 and the member 11 is a compression disc or washer 16 which I prefer to make of steel plate and of sufficient thickness to resist bending due to the pressure brought upon the same in closing the valve. This steel plate is simple to produce and is very inexpensive, as it comprises a single stamping operation, and I may coat the same with tin, zinc, cadmium, copper, etc., to prevent its rusting, or submit it to the sherardizing process, said steel plate distributes the stress quite uniformly over the upper face of the disc 15.

The various parts are assembled as shown in Fig. 1, and interposed between the nut 10 and the composition disc 15 is a washer 17, which may be of thin steel or brass, or other suitable metal to take the friction or cutting action off the disc 15 when the nut 10 is rotated, and also to distribute the compression stress of the nut over a larger area of the disc. When the nut 10 is drawn up with the parts assembled the member 11 is forced up against the shoulder 18 of the member 5 thereby bringing the members 11, 16, 15 and 17 in close, intimate and fixed relation with respect to each other between the shoulder 18 and the nut 10. All these parts, however, together with the member 5 and nut 10 are rotatable relative to the stem 1, but not movable in longitudinal direction with respect to the stem 1.

From the description given, it is believed that those skilled in the art will recognize the fact that I have produced a stem and head or holder which is very cheap and economical to manufacture and to produce the parts all substantially to gauge, and while there are a number of parts they are all simple and when assembled produce a single device, meeting all the requirements necessary.

There will no doubt be modifications of my invention which will be evident to those skilled in the art, but I do not wish to be limited other than by my claims.

I claim:

1. A valve shut off device comprising a rotatable stem provided with means cooperating with the valve body to move the stem longitudinally of the body when the stem is rotated, a head on one end of the stem, a connecting member secured to the stem in non-removable, swivel relation to the stem, a separately formed inverted cup-shaped member mounted on the connecting member, a composition disc mounted on the connecting member within the cup-shaped member and having one face exposed, a non-bendable separately formed washer interposed between the disc and the cup-shaped member and a nut threadably mounted on the connecting member to hold the cup-shaped member, the washer and the disc in fixed relation to each other and the cup-shaped member in engagement with a shoulder on the connecting member.

2. A valve shut off device comprising a stem, and a head swivelly secured thereto but non-removable, the head comprising a connecting member having a cup-shaped member in which is mounted a flange formed on the end of the stem and the wall of the member adapted to be turned over the flange to swivelly lock the stem in position, a stud on the connecting member having a thread thereon to receive a nut, an inverted disc holder mounted on the stud and engaging a shoulder on the connecting member which contacts with the holder for only a limited amount of its area, a composition disc mounted on the stud within the disc holder and having one face exposed, a washer positioned within the disc holder between the disc holder and the disc to resist bending and to distribute the downward thrust of the stem over the disc, the holder, connecting member, disc and disc holder held in fixed relation when the nut is properly operated.

3. A valve shut-off device comprising a stem of two separately formed parts arranged in rotatable and inseparable longitudinal relation, a flange on the end of one part overlapped by an inwardly formed flange on the other part to hold the parts together, a thread on each part, a shoulder formed on one of the said stem parts to engage a limited area of a separably formed and removable cup-shaped member, a removable and renewable composition disc having one face exposed to engage with a valve seat, a separably formed substantially non-flexing metal washer interposed between the disc and member to distribute the strain uniformly over the upper surface of the disc, registering openings through the disc, member and washer and through which extends one of the threaded stem parts, a nut on the last mentioned threaded stem part to removably secure the member, washer and disc to the said stem part against rotation with the member against the said shoulder.

In testimony whereof I affix my signature.

EDWARD J. KILEY.